(12) United States Patent
Jeter

(10) Patent No.: US 11,214,726 B2
(45) Date of Patent: Jan. 4, 2022

(54) COMPOSITIONS FOR DRILLING APPLICATIONS

(71) Applicant: Timothy B Jeter, Roanoke, VA (US)

(72) Inventor: Timothy B Jeter, Roanoke, VA (US)

( * ) Notice: Subject to any disclaimer, the term of this patent is extended or adjusted under 35 U.S.C. 154(b) by 0 days.

(21) Appl. No.: 15/799,865

(22) Filed: Oct. 31, 2017

(65) Prior Publication Data

US 2018/0163117 A1   Jun. 14, 2018

Related U.S. Application Data

(60) Provisional application No. 62/415,594, filed on Nov. 1, 2016.

(51) Int. Cl.
*C09K 8/38* (2006.01)
*C09K 8/06* (2006.01)

(52) U.S. Cl.
CPC . *C09K 8/38* (2013.01); *C09K 8/06* (2013.01)

(58) Field of Classification Search
None
See application file for complete search history.

(56) References Cited

U.S. PATENT DOCUMENTS

| 2003/0045605 A1* | 3/2003 | Thompson | C08K 5/00 523/130 |
| 2006/0142172 A1* | 6/2006 | Cioletti | C09K 8/524 510/365 |
| 2014/0262297 A1* | 9/2014 | Huang | E21B 43/16 166/309 |
| 2016/0177170 A1* | 6/2016 | Janak | C09K 8/74 507/242 |

* cited by examiner

*Primary Examiner* — John J Figueroa
(74) *Attorney, Agent, or Firm* — Rhodes IP PLC; Christopher R Rhodes

(57) ABSTRACT

Certain examples described herein are directed to a foaming agent for utilization in drilling that has greater environmental desirability due to the elimination of molecular ammonia and ammonium ion and further, has the added feature of greater economy while maintaining nominal to superior functioning in the capacity of lifting and performing at characteristic operating temperature. In some configurations, the compositions may desirably omit toxic or flammable substances to include lighter alcohols, and or environmentally persistent components. Further, various embodiments can achieve an improved level of foam stability.

8 Claims, No Drawings

COMPOSITIONS FOR DRILLING APPLICATIONS

PRIORITY APPLICATION

This application claims priority to, and the benefit of, U.S. Provisional Application No. 62/415,594 filed on Nov. 1, 2016, the entire disclosure of which is hereby incorporated herein by reference for all purposes.

TECHNOLOGICAL FIELD

An environmentally preferred agent(s) for generating foam used in producing bore holes which eliminates molecular ammonia and ammonium ion, produces foam of superior stability and has the desirable features of lifting water and particulates associated with the drilling process is described.

BACKGROUND

Historically foaming agents for the creation of boreholes utilized ions with undesirable environmental and or safety attributes Ammonia being most notable in this regard due to its toxicity. In the current setting of increased environmental awareness developers target the invention of more benign chemistries for this and other chemical products. Further, achieving greater economy and adding attributes to enhance performance are desirable.

SUMMARY

Certain configurations described herein utilize an economical surfactant species, optionally in combination with other species, to achieve reduced environmental and safety concerns. Further, an agent used for lowering freeze point is non-flammable and fully biodegradable. Functionality has been demonstrated in drilling operations for the recovery of drinking water and for the recovery of fossil fuels, though other drilling or boring applications using the composition are also possible.

In some instances, ionic surfactant compositions for drilling applications which do not incorporate molecular ammonia or ammonium ion, will produce uniquely stable foam, have the associated properties of performing well at characteristic operating temperature, provide lubricity and will lift particulates and water from bore holes are described.

In some aspects, the compositions comprise, for example, (a) about 5%-50% by weight of an alkyl or aryl or alkyl aryl or alkyl ether or aryl ether or alkyl aryl ether sulfate or sulfonate; (b) about 2%-30% by weight of an alkanolamine; (c) about 5%-50% by weight of a glycol ether or glycol or alcohol, and (d) about 20-80% by weight of water. In some instances, the composition does not include, and can be prepared without, any molecular ammonia or ammonium ions or species which will produce molecular ammonia or ammonium ions.

In one aspect, a drilling composition comprises an alkanolamine, a sulfonic acid, one or more of an alkyl ether, an aryl ether, an alkyl aryl ether, an alkyl ether sulfate or alkyl ether sulfonate, and optionally water. In some examples, the drilling composition is free of ammonia and ammonium ions.

In an additional aspect, a drilling composition comprises an alkanolamine selected from the group consisting of monoethanolamine, methyl diethanolamine and triethanolamine, a sulfonic acid, one or more of an alkyl ether, an aryl ether, an alkyl aryl ether, an alkyl ether sulfate or alkyl ether sulfonate, and optionally water. In some examples, the drilling composition is free of ammonia and ammonium ions.

In another aspect, a drilling composition comprises an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some instances, the drilling composition is free of ammonia and ammonium ions.

In an additional aspect, a drilling composition comprises an alkanolamine, a sulfonic acid, a glycol selected from the group consisting of ethylene glycol, propylene glycol and ethylene glycol monobutyl ether, and optionally water. In some examples, the drilling composition is free of ammonia and ammonium ions.

In another aspect, a drilling composition comprises an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some embodiments, the drilling composition is free of ammonia and ammonium ions.

In an additional aspect, a drilling composition comprises an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and optionally water. In some embodiments, the drilling composition is free of ammonia and ammonium ions.

In another aspect, a drilling composition comprises an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some instances, the drilling composition is free of ammonia and ammonium ions.

In an additional aspect, a drilling composition comprises an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some examples, the drilling composition is free of ammonia and ammonium ions.

In another aspect, a drilling composition consists essentially of an alkanolamine selected from the group consisting of monoethanolamine, methyl diethanolamine and triethanolamine, a sulfonic acid, one or more of an alkyl ether, an aryl ether, an alkyl aryl ether, an alkyl ether sulfate or alkyl ether sulfonate, and optionally water. In some examples, the drilling composition is free of ammonia and ammonium ions.

In an additional aspect, a drilling composition consists essentially of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some examples, the drilling composition is free of ammonia and ammonium ions.

In another aspect, a drilling composition consists essentially of an alkanolamine, a sulfonic acid, a glycol selected from the group consisting of ethylene glycol, propylene glycol and ethylene glycol monobutyl ether, and optionally water. In some examples, the drilling composition is free of ammonia and ammonium ions.

In an additional aspect, a drilling composition consists essentially of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some examples, the drilling composition is free of ammonia and ammonium ions.

In an another aspect, a drilling composition consists essentially of an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and optionally water. In some examples, the drilling composition is free of ammonia and ammonium ions.

In an additional aspect, a drilling composition consists essentially of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some examples, the drilling composition is free of ammonia and ammonium ions.

In another aspect, a drilling composition consists essentially of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some instances, the drilling composition is free of ammonia and ammonium ions.

In an additional aspect, a drilling composition consists of an alkanolamine selected from the group consisting of monoethanolamine, methyl diethanolamine and triethanolamine,
a sulfonic acid, one or more of an alkyl ether, an aryl ether, an alkyl aryl ether, an alkyl ether sulfate or alkyl ether sulfonate, and optionally water. In some instances, the drilling composition is free of ammonia and ammonium ions.

In another aspect, a drilling composition consists of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In certain instances, the drilling composition is free of ammonia and ammonium ions.

In an additional aspect, a drilling composition consists of an alkanolamine, a sulfonic acid, a glycol selected from the group consisting of ethylene glycol, propylene glycol and ethylene glycol monobutyl ether, and optionally water. In some instances, the drilling composition is free of ammonia and ammonium ions.

In another aspect, a drilling composition consists of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In certain examples, the drilling composition is free of ammonia and ammonium ions.

In an additional aspect, a drilling composition consists of an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and optionally water. In some instances, the drilling composition is free of ammonia and ammonium ions.

In another aspect, a drilling composition consists of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some instances, the drilling composition is free of ammonia and ammonium ions.

In an additional aspect, a drilling composition consists of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and optionally water. In some instances, the drilling composition is free of ammonia and ammonium ions.

In another aspect, a composition comprises a surfactant species comprising an alkanolamine reacted with an alkyl or alkyl aryl or aryl or alkyl ether or alkyl aryl ether or aryl ether sulfonate or sulfate, and a glycol ether or glycol or alcohol selected from a group consisting of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether, and optionally water.

In an additional aspect, a method for facilitating drilling whereby one or more of the compositions described herein are provided or introduced into a bore hole during drilling of the bore hole to lift particulates and water from the bore hole during the drilling operation.

Various other aspects and embodiments are directed to a composition comprising, but not limited to, the following components: An alkyl or alkyl ether or alkyl aryl or alkyl aryl ether or alkyl ether or aryl ether sulfonate or sulfate; an alkanolamine; optionally an alcohol or glycol or glycol ether; and optionally water

BRIEF DESCRIPTION OF THE FIGURES

There are no figures.

DETAILED DESCRIPTION

In certain examples, a composition to provide a stable foam in water and air for the purpose of facilitating the creation of boreholes which has the multiple attributed, e.g., lifting drilling particulates and water, is stable at characteristic operating temperatures and inhibits corrosion on metal surfaces, is provided. In some instances, the drilling composition does not include, and can be prepared without, any molecular ammonia or ammonium ions or species which will produce molecular ammonia or ammonium ions. For example, the composition may be ammonia free, ammonium ion free or both ammonia free and ammonium ion free.

In some instances, the composition comprises about 5 weight percent to about 50 weight percent of a protic ionic surfactant. For example, a protic ionic surfactant to have a characteristic negative charge within the unprotonated body of the molecule can be present at about 5% by weight to about 50% by weight.

In other instances, the composition comprises one or more of an alkyl or alkyl ether or aryl or aryl ether or alkyl aryl ether or alkyl ether sulfate or alkyl ether sulfonate. For example, one or more of an alkyl or alkyl ether or aryl or aryl ether or alkyl aryl ether or alkyl ether sulfate or alkyl ether sulfonate can be present at about 5% by weight to about 50% by weight. Where more than one alkyl or alkyl ether or aryl or aryl ether or alkyl aryl ether or alkyl ether sulfate or alkyl ether sulfonate is present, the combined weight percentages of these components can be about 5% by weight to about 50% by weight. One illustration of a sulfonate that can be used is dodecylbenzene sulfonic acid or other sulfonic acids which comprise ten, eleven or twelve or more carbon atoms and may be aromatic or non-aromatic. In some instances, the sulfonic acid comprises sixteen, seventeen, eighteen or more carbon atoms and may be aromatic or non-aromatic. For example, the sulfonic acid or sulfonate may be dodecylbenzene sulfonic acid, tridecylbenzene sulfonic acid or tetradecylbenzene sulfonic acid.

In additional instances, the composition comprises an alkanolamine. For example, an alkanolamine selected from one or more of monoethanolamine, diethanolamine, triethanolamine, methyldiethanolamine, methylmonoethanolamine or dimethylmonoethanolamine can be present. In some examples, two or more different alkanolamines may be present. The weight percentage of the alkanolamine component may vary from 2 weight percent to about 50 weight percent, more particularly about 2% by weight to about 30% by weight based on the total weight of the composition.

In further examples, the composition may comprises a glycol ether or glycol or alcohol comprising one or more of propylene glycol, ethylene glycol, ethylene glycol monobutyl ether, propylene glycol, propylene glycol monobutyl ether, dipropylene glycol, dipropylene glycol monobutyl ether or propylene glycol monomethyl ether or butanol (or other alcohol with 4 or more carbon atoms) or hexylene glycol. The glycol ether component, when present may be present at about 10% to 40% by weight.

In some embodiments, the composition comprises water to make 100% by weight. For example, the balance of the composition may comprise water.

In some examples, the compositions may be beneficially used in drilling operations. For example, evaluation with regard to foam height and stability and lifting efficiency will provide the operator with guidelines for dilution rates of the composition when used in a drilling operation.

In some embodiments, the product is supplied as described herein and is provided as a concentrate to be diluted and foamed for field use. For example, the product may be provided in a generally non-aqueous form and water may be added to dilute the product prior to use. If desired other liquids such as methanol, ethanol or other non-aqueous liquid can also be used to dilute the composition prior to use. Formation of the unique surfactant species occurs, for example, during blending of the components.

In some examples, the compositions described herein may consist essentially of (i) an alkanolamine, (ii) protic ionic surfactant, (iii) an alkyl or alkyl ether or aryl or aryl ether or alkyl aryl ether or alkyl ether sulfate or alkyl ether sulfonate and (iv) water. The alkanolamine, protic ionic surfactant and alkyl or alkyl ether or aryl or aryl ether or alkyl aryl ether or alkyl ether sulfate or alkyl ether sulfonate may be any of those described herein or other suitable materials to provide a suitable drilling composition. Minor impurities may also be present in any one or more of these materials but generally are not expected to contribute to any desirable properties provided by the drilling composition. The drilling composition can be produced without any ammonia ions or without any ammonium ions or without any ammonia ions and without ammonium ions.

In other examples, the compositions described herein consists of (i) an alkanolamine, (ii) protic ionic surfactant, (iii) an alkyl or alkyl ether or aryl or aryl ether or alkyl aryl ether or alkyl ether sulfate or alkyl ether sulfonate and (iv) water. The alkanolamine, protic ionic surfactant and alkyl or alkyl ether or aryl or aryl ether or alkyl aryl ether or alkyl ether sulfate or alkyl ether sulfonate may be any of those described herein or other suitable materials to provide a suitable drilling composition. The drilling composition can be produced without any ammonia ions or without any ammonium ions or without any ammonia ions and without ammonium ions.

In certain embodiments, a drilling composition comprises an alkanolamine, a sulfonic acid, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine is monoethanolamine, the sulfonic acid is dodecylbenzene sulfonic acid, and the one or more of an alkyl ether, an aryl ether, an alkyl aryl ether, an alkyl ether sulfate or alkyl ether sulfonate is ethylene glycol.

In other examples, the composition comprises 5% to 20% by weight of the monoethanolamine, 10% to 40% by weight of the dodecylbenzene sulfonic acid, 5% to 40% by weight of the ethylene glycol with the balance being water to provide 100% by weight.

In some embodiments, the alkanolamine is triethanolamine, the sulfonic acid is dodecylbenzene sulfonic acid, and the one or more of an alkyl ether, an aryl ether, an alkyl aryl ether, an alkyl ether sulfate or alkyl ether sulfonate is ethylene glycol monobutyl ether.

In other examples, the composition comprises 5% to 20% by weight of the triethanolamine, 10% to 40% by weight of the dodecylbenzene sulfonic acid, 5% to 40% by weight of the ethylene glycol monobutyl ether with the balance being water to provide 100% by weight.

In some examples, the alkanolamine is methyl diethanolamine, the sulfonic acid is dodecylbenzene sulfonic acid, and the one or more of an alkyl ether, an aryl ether, an alkyl aryl ether, an alkyl ether sulfate or alkyl ether sulfonate is propylene glycol.

In other examples, the composition comprises 5% to 20% by weight of the methyl diethanolamine, 10% to 40% by weight of the dodecylbenzene sulfonic acid, 5% to 40% by weight of the propylene glycol with the balance being water to provide 100% by weight.

In certain examples, the drilling composition consists essentially of the alkanolamine, the sulfonic acid, one of an alkyl ether, an aryl ether, an alkyl aryl ether, an alkyl ether sulfate or alkyl ether sulfonate, and water. In other examples, the drilling composition consists of the alkanolamine, the sulfonic acid, one of an alkyl ether, an aryl ether, an alkyl aryl ether, an alkyl ether sulfate or alkyl ether sulfonate, and water.

In sine instances, the drilling composition consists of 5% to 20% by weight of monoethanolamine, 10% to 40% by weight of dodecylbenzene sulfonic acid, 5% to 40% by weight of ethylene glycol with the balance being water to provide 100% by weight.

In other embodiments, a drilling composition comprises an alkanolamine selected from the group consisting of monoethanolamine, methyl diethanolamine and triethanolamine,
a sulfonic acid, one or more of an alkyl ether, an aryl ether, an alkyl aryl ether, an alkyl ether sulfate or alkyl ether sulfonate, and water, wherein the drilling composition is free of ammonia and ammonium ions.

In certain examples, the sulfonic acid comprises dodecylbenzene sulfonic acid.

In other examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In some examples, the sulfonic acid comprises eighteen to twenty carbon atoms.

In certain instances, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other embodiments, a drilling composition comprises an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises one or more of monoethanolamine, methyl diethanolamine and triethanolamine.

In other examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In other examples, the alkanolamine comprises one or more of monoethanolamine, diethanolamine, triethanolamine, methyldiethanolamine, methylmonoethanolamine or dimethylmonoethanolamine.

In further examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other embodiments, a drilling composition comprises an alkanolamine, a sulfonic acid, a glycol selected from the group consisting of ethylene glycol, propylene glycol and ethylene glycol monobutyl ether, and water, wherein the drilling composition is free of ammonia and ammonium ions.

In some examples, the alkanolamine comprises one or more of monoethanolamine, methyl diethanolamine and triethanolamine.

In other examples, the sulfonic acid comprises dodecylbenzene sulfonic acid.

In further examples, the sulfonic acid comprises eighteen to twenty carbon atoms.

In additional examples, the alkanolamine comprises one or more of monoethanol amine, diethanolamine, triethanol amine, methyldiethanolamine, methylmonoethanolamine or dimethylmonoethanolamine.

In some embodiments, a drilling composition comprises an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other examples, the sulfonic acid comprises dodecylbenzene sulfonic acid.

In some examples, the one or more of an alkyl ether, an aryl ether, an alkyl aryl ether, an alkyl ether sulfate or alkyl ether sulfonate comprises ethylene glycol, propylene glycol and ethylene glycol monobutyl ether. In other embodiments, the alkanolamine is monoethanolamine or triethanolamine.

In certain embodiments, a drilling composition comprises an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and water, wherein the drilling composition is free of ammonia and ammonium ions.

In some examples, the sulfonic acid comprises eighteen to twenty carbon atoms.

In other examples, the sulfonic acid comprises dodecylbenzene sulfonic acid.

In certain instances, the alkanolamine is monoethanolamine or triethanolamine.

In some examples, the glycol is ethylene glycol or ethylene glycol monobutyl ether.

In some examples, a drilling composition comprises an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In certain instances, the alkanolamine comprises one or more of monoethanolamine, diethanolamine, triethanolamine, methyldiethanolamine, methylmonoethanolamine or dimethylmonoethanolamine.

In other examples, the sulfonic acid comprises dodecylbenzene sulfonic acid.

In some embodiments, the one or more of an alkyl ether, an aryl ether, an alkyl aryl ether, an alkyl ether sulfate or alkyl ether sulfonate is a glycol.

In other embodiments, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In some examples, a drilling composition comprises an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In certain embodiments, the alkanolamine comprises monoethanolamine or triethanolamine.

In other embodiments, the sulfonic acid comprises dodecylbenzene sulfonic acid.

In some examples, the one or more of an alkyl ether, an aryl ether, an alkyl aryl ether, an alkyl ether sulfate or alkyl ether sulfonate is a glycol.

In other examples, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In certain embodiments, a drilling composition consists essentially of an alkanolamine selected from the group consisting of monoethanolamine, methyl diethanolamine and triethanolamine, a sulfonic acid, one or more of an alkyl ether, an aryl ether, an alkyl aryl ether, an alkyl ether sulfate or alkyl ether sulfonate, and water, wherein the drilling composition is free of ammonia and ammonium ions.

In some examples, the sulfonic acid comprises dodecylbenzene sulfonic acid.

In other examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In some embodiments, the sulfonic acid comprises eighteen to twenty carbon atoms.

In other embodiments, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other examples, a drilling composition consists essentially of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises one or more of monoethanolamine, methyl diethanolamine and triethanolamine.

In other examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In some embodiments, the alkanolamine comprises one or more of monoethanolamine, diethanolamine, triethanolamine, methyldiethanolamine, methylmonoethanolamine or dimethylmonoethanolamine.

In certain examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In some examples, a drilling composition consists essentially of an alkanolamine, a sulfonic acid, a glycol selected from the group consisting of ethylene glycol, propylene glycol and ethylene glycol monobutyl ether, and water, wherein the drilling composition is free of ammonia and ammonium ions.

In certain instances, the alkanolamine comprises one or more of monoethanolamine, methyl diethanolamine and triethanolamine.

In other instances, the sulfonic acid comprises dodecylbenzene sulfonic acid.

In some examples, the sulfonic acid comprises eighteen to twenty carbon atoms.

In other examples, the alkanolamine comprises one or more of monoethanolamine, diethanolamine, triethanolamine, methyldiethanolamine, methylmonoethanolamine or dimethylmonoethanolamine.

In some embodiments, a drilling composition consists essentially of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other examples, the sulfonic acid comprises dodecylbenzene sulfonic acid.

In some examples, the one or more of an alkyl ether, an aryl ether, an alkyl aryl ether, an alkyl ether sulfate or alkyl ether sulfonate comprises ethylene glycol, propylene glycol and ethylene glycol monobutyl ether.

In other embodiments, the alkanolamine is monoethanolamine or triethanolamine.

In certain examples, a drilling composition consists essentially of an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and water, wherein the drilling composition is free of ammonia and ammonium ions.

In some embodiments, the sulfonic acid comprises eighteen to twenty carbon atoms.

In other embodiments, the sulfonic acid comprises dodecylbenzene sulfonic acid.

In some examples, the alkanolamine is monoethanolamine or triethanolamine

In certain examples, the glycol is ethylene glycol or ethylene glycol monobutyl ether.

In other examples, a drilling composition consists essentially of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises one or more of monoethanolamine, diethanolamine, triethanolamine, methyldiethanolamine, methylmonoethanolamine or dimethylmonoethanolamine.

In other examples, the sulfonic acid comprises dodecylbenzene sulfonic acid.

In some examples, the one or more of an alkyl ether, an aryl ether, an alkyl aryl ether, an alkyl ether sulfate or alkyl ether sulfonate is a glycol.

In additional examples, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In certain embodiments, a drilling composition consists essentially of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises monoethanolamine or dimethylmonoethanolamine.

In other examples, the sulfonic acid comprises dodecylbenzene sulfonic acid.

In some embodiments, the one or more of an alkyl ether, an aryl ether, an alkyl aryl ether, an alkyl ether sulfate or alkyl ether sulfonate is a glycol.

In other embodiments, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In certain examples, a drilling composition consists of an alkanolamine selected from the group consisting of monoethanolamine, methyl diethanolamine and triethanolamine, a sulfonic acid, one or more of an alkyl ether, an aryl ether, an alkyl aryl ether, an alkyl ether sulfate or alkyl ether sulfonate, and water, wherein the drilling composition is free of ammonia and ammonium ions.

In some examples, the sulfonic acid comprises dodecylbenzene sulfonic acid.

In certain examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In other examples, the sulfonic acid comprises eighteen to twenty carbon atoms.

In some examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In certain embodiments, a drilling composition consists of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises one or more of monoethanolamine, methyl diethanolamine and triethanolamine.

In some examples, the one or more of an alkyl ether, an aryl ether, an alkyl aryl ether, an alkyl ether sulfate or alkyl ether sulfonate comprises ethylene glycol, propylene glycol or ethylene glycol monobutyl ether.

In certain instances, the alkanolamine comprises one or more of monoethanolamine, diethanolamine, triethanolamine, methyldiethanolamine, methylmonoethanolamine or dimethylmonoethanolamine.

In some instances, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In certain embodiments, a drilling composition consists of an alkanolamine, a sulfonic acid, a glycol selected from the group consisting of ethylene glycol, propylene glycol and ethylene glycol monobutyl ether, and water, wherein the drilling composition is free of ammonia and ammonium ions.

In some examples, the alkanolamine comprises one or more of monoethanolamine, methyl diethanolamine and triethanolamine.

In other examples, the sulfonic acid comprises dodecylbenzene sulfonic acid.

In some instances, the sulfonic acid comprises eighteen to twenty carbon atoms.

In some embodiments, the alkanolamine comprises one or more of monoethanolamine, diethanolamine, triethanolamine, methyldiethanolamine, methylmonoethanolamine or dimethylmonoethanolamine.

In other embodiments, a drilling composition consists of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the one or more of an alkyl ether, an aryl ether, an alkyl aryl ether, an alkyl ether sulfate or alkyl ether sulfonate comprises one or more of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other examples, the sulfonic acid comprises dodecylbenzene sulfonic acid.

In certain examples, the one or more of an alkyl ether, an aryl ether, an alkyl aryl ether, an alkyl ether sulfate or alkyl ether sulfonate comprises ethylene glycol, propylene glycol and ethylene glycol monobutyl ether.

In other examples, the alkanolamine is monoethanolamine or triethanolamine.

In certain embodiments, a drilling composition consists of an alkanolamine selected from the group consisting of monoethanolamine, methyl diethanolamine and triethanolamine, a sulfonic acid, a glycol selected from the group consisting of ethylene glycol, propylene glycol and ethylene glycol monobutyl ether, and water, wherein the drilling composition is free of ammonia and ammonium ions.

In some examples, the sulfonic acid comprises eighteen to twenty carbon atoms.

In other examples, the sulfonic acid comprises dodecylbenzene sulfonic acid.

In certain examples, the alkanolamine is monoethanolamine or triethanolamine.

In some examples, the glycol is ethylene glycol or ethylene glycol monobutyl ether.

In some embodiments, a drilling composition consists of an alkanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In some examples, the alkanolamine comprises one or more of monoethanolamine, diethanolamine, triethanolamine, methyldiethanolamine, methylmonoethanolamine or dimethylmonoethanolamine.

In other examples, the sulfonic acid comprises dodecylbenzene sulfonic acid.

In some examples, the one or more of an alkyl ether, an aryl ether, an alkyl aryl ether, an alkyl ether sulfate or alkyl ether sulfonate is a glycol.

In additional examples, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In other embodiments, a drilling composition consists of an alkanolamine selected from the group consisting of monoethanolamine, methyl diethanolamine and triethanolamine, a sulfonic acid comprising eighteen to twenty carbon atoms, one or more of an alkyl ether, an aryl ether, an alkyl aryl ether, an alkyl ether sulfate or alkyl ether sulfonate, and water, wherein the drilling composition is free of ammonia and ammonium ions.

In certain examples, the alkanolamine comprises monoethanolamine or triethanolamine.

In some examples, the sulfonic acid comprises dodecylbenzene sulfonic acid.

In certain examples, the one or more of an alkyl ether, an aryl ether, an alkyl aryl ether, an alkyl ether sulfate or alkyl ether sulfonate is a glycol.

In some examples, the glycol is one or more of propylene glycol, ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

In some embodiments, a composition comprises a surfactant species comprising an alkanolamine reacted with an alkyl or alkyl aryl or aryl or alkyl ether or alkyl aryl ether or aryl ether sulfonate or sulfate, and a glycol ether or glycol or alcohol selected from a group consisting of propylene glycol, or ethylene glycol, ethylene glycol monobutyl ether, propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether, and optionally water.

In some examples, the surfactant species is present from 5 percent by weight to 50 percent by weight, the glycol ether or glycol or alcohol is present between 10 percent by weight to 75 percent by weight with the balance of the weight being water to total 100 weight percent.

In other examples, a A method for facilitating drilling whereby any one or more of the compositions described herein is provided or introduced into a bore hole during drilling of the bore hole to lift particulates and water from the bore hole during the drilling operation. For example, the compositions can be used in water well drilling operations, oil drilling operations, natural gas drilling operations or other drilling operations.

Certain non-limited combinations of specific materials are provided below for convenience.

EXAMPLE 1

A drilling composition can be produced by combining monoethanolamine, dodecylbenzene sulfonic acid, ethylene glycol and water. The weight percentages of each of the components can be 5% to 20% by weight monoethanolamine, 10% to 40% by weight of the sulfonate, 5% to 40% by weight of the ethylene glycol with the balance being water to provide 100% by weight. The drilling composition does not include, and can be prepared without, any molecular ammonia or ammonium ions or species which will produce molecular ammonia or ammonium ions.

EXAMPLE 2

A drilling composition can be produced by combining triethanolamine, dodecylbenzene sulfonic acid, ethylene glycol monobutyl ether and water. The weight percentages of each of the components can be 5% to 20% by weight triethanolamine, 10%-40% by weight of the sulfonate, 5% to 40% by weight of the ethylene glycol monobutyl ether with the balance being water to provide 100% by weight. The drilling composition does not include, and can be prepared without, any molecular ammonia or ammonium ions or species which will produce molecular ammonia or ammonium ions.

EXAMPLE 3

A drilling composition can be produced by combining methyl diethanolamine, dodecylbenzene sulfonic acid, propylene glycol and water. The weight percentages of each of the components can be 5% to 20% by weight methyl diethanolamine, 10% to 40% by weight of the sulfonate, 5% to 40% by weight of the propylene glycol with the balance being water to provide 100% by weight. The drilling composition does not include, and can be prepared without, any molecular ammonia or ammonium ions or species which will produce molecular ammonia or ammonium ions.

EXAMPLE 4

A drilling composition can be produced by combining monoethanolamine, dodecylbenzene sulfonic acid, ethylene glycol monobutyl ether and water. The weight percentages of each of the components can be 5% to 20% by weight monoethanolamine, 10% to 40% by weight of the sulfonate, 5% to 40% by weight of the ethylene glycol monobutyl ether with the balance being water to provide 100% by weight. The drilling composition does not include, and can be prepared without, any molecular ammonia or ammonium ions or species which will produce molecular ammonia or ammonium ions.

EXAMPLE 5

A drilling composition can be produced by combining triethanolamine, dodecylbenzene sulfonic acid, ethylene glycol and water. The weight percentages of each of the components can be 5% to 20% by weight triethanolamine, 10%-40% by weight of the sulfonate, 5% to 40% by weight of the ethylene glycol with the balance being water to provide 100% by weight. The drilling composition does not include, and can be prepared without, any molecular ammonia or ammonium ions or species which will produce molecular ammonia or ammonium ions.

EXAMPLE 6

A drilling composition can be produced by combining triethanolamine, dodecylbenzene sulfonic acid, propylene glycol and water. The weight percentages of each of the components can be 5% to 20% by weight triethanolamine, 10%-40% by weight of the sulfonate, 5% to 40% by weight of the propylene glycol with the balance being water to provide 100% by weight. The drilling composition does not include, and can be prepared without, any molecular ammonia or ammonium ions or species which will produce molecular ammonia or ammonium ions.

EXAMPLE 7

A drilling composition can be produced by combining methyl diethanolamine, dodecylbenzene sulfonic acid, ethylene glycol and water. The weight percentages of each of the components can be 5% to 20% by weight methyl diethanolamine, 10% to 40% by weight of the sulfonate, 5% to 40% by weight of the ethylene glycol with the balance being water to provide 100% by weight. The drilling composition does not include, and can be prepared without, any molecular ammonia or ammonium ions or species which will produce molecular ammonia or ammonium ions.

EXAMPLE 8

A drilling composition can be produced by combining methyl diethanolamine, dodecylbenzene sulfonic acid, ethylene glycol monobutyl ether and water. The weight percentages of each of the components can be 5% to 20% by weight methyl diethanolamine, 10% to 40% by weight of the sulfonate, 5% to 40% by weight of the ethylene glycol monobutyl ether with the balance being water to provide 100% by weight. The drilling composition does not include, and can be prepared without, any molecular ammonia or ammonium ions or species which will produce molecular ammonia or ammonium ions.

EXAMPLE 9

A drilling composition can be produced by combining monoethanolamine, a sulfonic acid with 10-12 carbon atoms, ethylene glycol and water. The weight percentages of each of the components can be 5% to 20% by weight monoethanolamine, 10% to 40% by weight of the sulfonic acid, 5% to 40% by weight of the ethylene glycol with the balance being water to provide 100% by weight. The drilling composition does not include, and can be prepared without, any molecular ammonia or ammonium ions or species which will produce molecular ammonia or ammonium ions.

EXAMPLE 10

A drilling composition can be produced by combining triethanolamine, a sulfonic acid with 10-12 carbon atoms, ethylene glycol monobutyl ether and water. The weight percentages of each of the components can be 5% to 20% by weight triethanolamine, 10%-40% by weight of the sulfonic acid, 5% to 40% by weight of the ethylene glycol monobutyl ether with the balance being water to provide 100% by weight. The drilling composition does not include, and can be prepared without, any molecular ammonia or ammonium ions or species which will produce molecular ammonia or ammonium ions.

EXAMPLE 11

A drilling composition can be produced by combining methyl diethanolamine, a sulfonic acid with 10-12 carbon atoms, propylene glycol and water. The weight percentages of each of the components can be 5% to 20% by weight methyl diethanolamine, 10% to 40% by weight of the sulfonic acid, 5% to 40% by weight of the propylene glycol with the balance being water to provide 100% by weight. The drilling composition does not include, and can be prepared without, any molecular ammonia or ammonium ions or species which will produce molecular ammonia or ammonium ions.

EXAMPLE 12

The composition of Example 2 was used in a drilling operation to drill a drinking water well. During the drilling operation, the composition was introduced into the bore hole and lifted particulates and water from the bore hole.

EXAMPLE 13

The composition of Example 2 was used in recovery of natural gas wells. During the drilling operation, the composition was introduced into the bore hole and lifted particulates and water from the bore hole.

Additional aspects, embodiments, examples and features will be recognized by the person of ordinary skill in the art, given the benefit of this disclosure.

What is claimed is:

1. A foam drilling composition consisting of:
   triethanolamine;
   a sulfonic acid;
   one or more of an alkyl ether, an aryl ether, an alkyl aryl ether, an alkyl ether sulfate or alkyl ether sulfonate; and
   water;
   wherein the foam drilling composition is free of ammonia and ammonium ions and is effective to lift drilling particulates and inhibit corrosion on metal surfaces.

2. The foam drilling composition of claim 1, wherein the sulfonic acid is dodecylbenzene sulfonic acid.

3. The foam drilling composition of claim 2, wherein the composition comprises 5% to 20% by weight of the triethanolamine, 10% to 40% by weight of the dodecylbenzene sulfonic acid, 5% to 40% by weight of ethylene glycol monobutyl ether as the alkyl ether with the balance being water to provide 100% by weight.

4. The foam drilling composition of claim 1, wherein the one or more of an alkyl ether, an aryl ether, an alkyl aryl ether, an alkyl ether sulfate or alkyl ether sulfonate is one or more of ethylene glycol, propylene glycol or ethylene glycol monobutyl ether.

5. The foam drilling composition of claim 1, wherein the one or more of an alkyl ether, an aryl ether, an alkyl aryl ether, an alkyl ether sulfate or alkyl ether sulfonate is one or more of propylene glycol monobutyl ether, dipropylene glycol monobutyl ether, diethylene glycol monobutyl ether, propylene glycol monomethyl ether, dipropylene glycol monomethyl ether, diethylene glycol monomethyl, butanol or hexylene glycol ether.

6. The foam drilling composition of claim 1, wherein the sulfonic acid comprises eighteen to twenty carbon atoms.

7. The foam drilling composition of claim 1, wherein the sulfonic acid is tridecylbenzene sulfonic acid.

8. The foam drilling composition of claim 1, wherein the sulfonic acid is tetradecylbenzene sulfonic acid.

* * * * *